US012650948B2

(12) United States Patent
Janus et al.

(10) Patent No.: US 12,650,948 B2
(45) Date of Patent: Jun. 9, 2026

(54) LOCAL OBJECT TRANSPORT PROXY FOR DATA CENTER COMPUTING NODES

(71) Applicant: CoreWeave, Inc., Livingston, NJ (US)

(72) Inventors: Nicholas Charles Christopher Janus, Natick, MA (US); Braden Gibson, Riverview, FL (US); Maksym Kuznetsov, Ottawa (CA)

(73) Assignee: CoreWeave, Inc., Livingston, NJ (US)

( * ) Notice: Subject to any disclaimer, the term of this patent is extended or adjusted under 35 U.S.C. 154(b) by 0 days.

(21) Appl. No.: 19/334,325

(22) Filed: Sep. 19, 2025

(65) Prior Publication Data

US 2026/0140917 A1 May 21, 2026

Related U.S. Application Data

(60) Provisional application No. 63/721,874, filed on Nov. 18, 2024.

(51) Int. Cl.
*G06F 15/173* (2006.01)
*G06F 9/50* (2006.01)
*G06F 9/54* (2006.01)

(52) U.S. Cl.
CPC ...... *G06F 15/17331* (2013.01); *G06F 9/5016* (2013.01); *G06F 9/54* (2013.01)

(58) Field of Classification Search
CPC .............................................. G06F 15/17331
See application file for complete search history.

(56) References Cited

U.S. PATENT DOCUMENTS

| | | | |
|---|---|---|---|
| 11,044,118 B1* | 6/2021 | Reed ....................... H04L 12/66 |
| 2018/0121357 A1* | 5/2018 | Gou .................... G06F 12/0813 |
| 2021/0019194 A1* | 1/2021 | Bahl ................... H04L 67/1031 |
| 2021/0157740 A1* | 5/2021 | Benhanokh ......... G06F 12/0877 |
| 2021/0392477 A1 | 12/2021 | Taft et al. |
| 2022/0091657 A1* | 3/2022 | Tsien .................... G06F 9/4893 |
| 2023/0014344 A1* | 1/2023 | Venugopal ............ G06F 18/214 |
| 2023/0176908 A1* | 6/2023 | Sinha .................... G06F 9/5027 |
| | | | 718/100 |
| 2023/0379397 A1 | 11/2023 | Su et al. |
| 2024/0256153 A1 | 8/2024 | Chatterjee et al. |

FOREIGN PATENT DOCUMENTS

| | | |
|---|---|---|
| CN | 116860157 A | 10/2023 |
| WO | WO 2022120254 A1 | 6/2022 |

OTHER PUBLICATIONS

Kubernetes.io [online], "Expose Pod Information to Containers Through Files," Aug. 24, 2023, retrieved on Oct. 23, 2025, retrieved from URL<https://kubernetes.io/docs/tasks/inject-data-application/downward-api-volume-expose-pod-information/>, 6 pages.

* cited by examiner

*Primary Examiner* — Courtney P Spann
(74) *Attorney, Agent, or Firm* — Fish & Richardson P.C.

(57) ABSTRACT

Methods and systems, including computer-readable media, are described for retrieving data from a cluster-wide cache. The methods include receiving a request, by a local object transport proxy on a first computing node, from a hardware accelerator unit for a data object. The methods include determining, by the local object transport proxy, that the data object exists in the cluster-wide cache and retrieving, by the local object transport proxy, the data object from the cluster-wide cache.

48 Claims, 8 Drawing Sheets

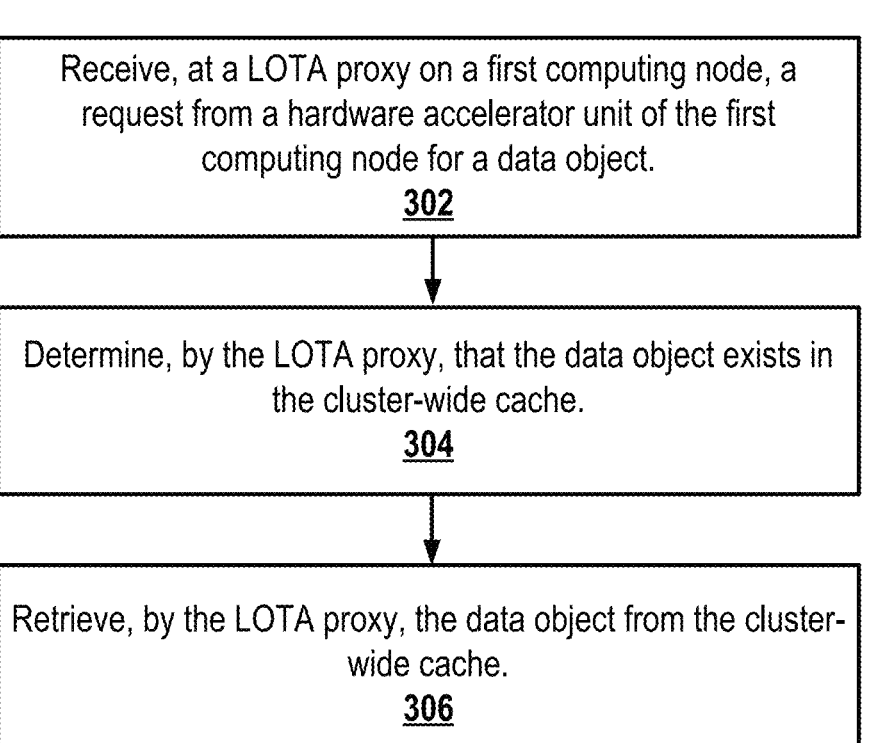
Receive, at a LOTA proxy on a first computing node, a request from a hardware accelerator unit of the first computing node for a data object.
302
Determine, by the LOTA proxy, that the data object exists in the cluster-wide cache.
304
Retrieve, by the LOTA proxy, the data object from the cluster-wide cache.
306
Fig. 3

500

```
┌─────────────────────────────────────────────┐
│  Receive, by a LOTA proxy on a first         │
│  computing node, a request from a hardware   │
│  accelerator unit of the first computing     │
│  node for a data object.                     │
│  502                                         │
└─────────────────────────────────────────────┘
                      │
                      ▼
┌─────────────────────────────────────────────┐
│  Determine, by the LOTA proxy, that the data │
│  object exists in the cluster-wide cache.    │
│  504                                         │
└─────────────────────────────────────────────┘
                      │
                      ▼
┌─────────────────────────────────────────────┐
│  Retrieve, by the LOTA proxy, the data       │
│  object from the cluster-wide cache.         │
│  506                                         │
└─────────────────────────────────────────────┘
                      │
                      ▼
┌─────────────────────────────────────────────┐
│  Determine that another data object does not │
│  exist in the cluster-wide cache.            │
│  508                                         │
└─────────────────────────────────────────────┘
                      │
                      ▼
┌─────────────────────────────────────────────┐
│  Retrieve, by the LOTA proxy, the other data │
│  object from an object repository of the     │
│  computing cluster and provide the other     │
│  data object to the requesting hardware      │
│  accelerator unit.                           │
│  510                                         │
└─────────────────────────────────────────────┘
                      │
                      ▼
┌─────────────────────────────────────────────┐
│  Store the other data object in the          │
│  cluster-wide cache.                         │
│  512                                         │
└─────────────────────────────────────────────┘
```

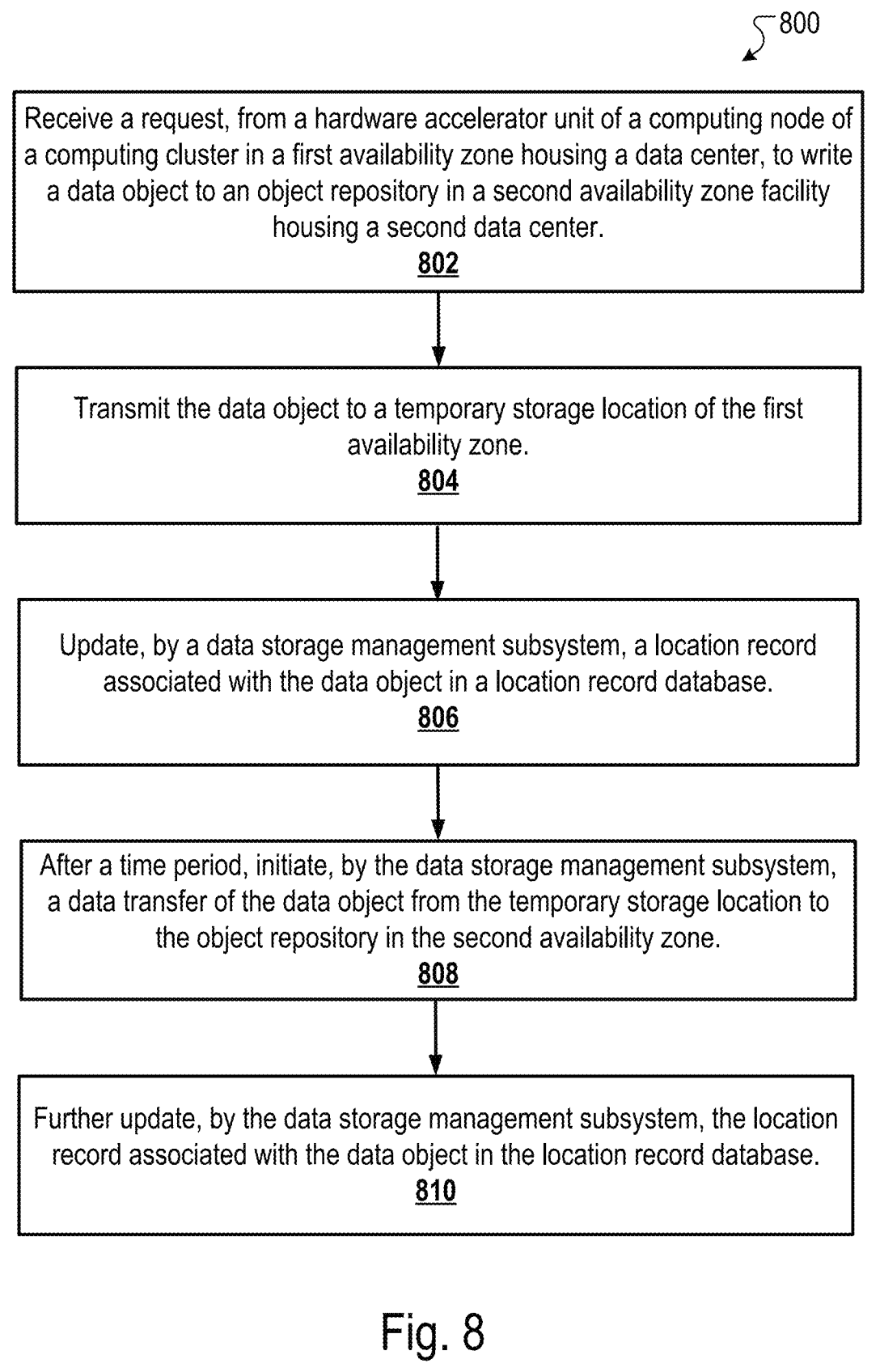

Receive a request, from a hardware accelerator unit of a computing node of a computing cluster in a first availability zone housing a data center, to write a data object to an object repository in a second availability zone facility housing a second data center.
802

↓

Transmit the data object to a temporary storage location of the first availability zone.
804

↓

Update, by a data storage management subsystem, a location record associated with the data object in a location record database.
806

↓

After a time period, initiate, by the data storage management subsystem, a data transfer of the data object from the temporary storage location to the object repository in the second availability zone.
808

↓

Further update, by the data storage management subsystem, the location record associated with the data object in the location record database.
810

Fig. 8

LOCAL OBJECT TRANSPORT PROXY FOR DATA CENTER COMPUTING NODES

CROSS-REFERENCE TO RELATED APPLICATION

This application claims the benefit of priority under 35 U.S.C. § 119 to U.S. Provisional Patent Application No. 63/721,874, filed on Nov. 18, 2024. The entire contents of the prior application is incorporated by reference herein.

BACKGROUND

This specification relates to high-performance data centers.

A high-performance data center is a facility that houses many co-located computing nodes in order to efficiently execute computing workloads that benefit from substantial parallel processing power. Such workloads are common in the fields of artificial intelligence and machine learning, scientific simulations, data analysis, and image rendering.

A computing cluster in a data center has multiple computing nodes that are configured to repeatedly operate on delegated portions of a task. Operating many computing nodes concurrently can efficiently scale the performance throughput for many high-performance computing tasks. Each computing node typically has at least one central processing unit (CPU) to effectuate an operating system and network communications.

Each computing node also typically has specialized acceleration hardware to further scale up the parallel processing performance of the cluster. For example, a computing node can be equipped with a CPU and multiple graphics processing units (GPUs), which each have hundreds or thousands of individual processing elements. The CPU can execute software that takes care of accepting delegated tasks and distributing portions of the task among the GPUs. Other types of acceleration hardware that are used in high-performance data centers include tensor processing units (TPUs), neural processing units (NPUs), field-programmable gate arrays (FPGAs), and application-specific integrated circuits (ASICs), to name just a few examples. Each of these types of acceleration hardware have different strengths and weaknesses, and thus, which one is appropriate is often dependent on the particular workload.

Modem high-performance data centers typically operate on massive amounts of underlying data. For example, a machine learning application can be designed to train a large language model (LLM) on many terabytes or even petabytes of data. One of the primary performance bottlenecks of these types of applications is thus moving data from an underlying large-scale storage system to the acceleration hardware as well as writing the computations by the acceleration hardware back to the underlying storage system.

SUMMARY

This specification describes how a computing cluster can implement a local object transport accelerator proxy on each computing node of the computing cluster in order to speed up the process of transporting data objects to and from hardware accelerator units working on a task. The local object transport accelerator proxies can effectively bypass ordinary gateways for retrieving data objects from a large-scale object repository. In some cases, the object repository is located in the same data center (e.g., availability zone (AZ)) as the computing cluster. In some other cases, the object repository is located in a different data center (e.g., a different AZ) as the computing cluster.

An object storage gateway is a hardware or software implemented interface that allows users to interact with data objects stored in an associated object repository, e.g., read, write, and update. The object storage gateway facilitates protocol translation, data access, and management by bridging traditional storage interfaces (like file or block protocols) with object-based storage systems, enabling integration and interoperability across diverse environments. The object storage gateway can handle operations like authentication, authorization, data chunking, and caching. However, object storage gateways also introduce performance bottlenecks and latency to the system, which can reduce the speed at which data objects can be read from the object repository and written to the object repository.

To bypass the ordinary object storage gateways for retrieving data objects from the object repository faster (from a cluster in the same AZ or from a cluster in a different AZ), the local object transport accelerator proxies can first obtain presigned requests from the object storage gateway. The object storage gateway can generate the presigned requests after performing any necessary authorization and authentication, among other operations. Thereafter, the local object transport accelerator proxies can use the presigned requests to obtain data objects directly from the object repository on a data path that does not go through the object storage gateway. This functionality greatly speeds up data transfer while also allowing a single object repository to service multiple untrusted clusters. In addition, the local object transport accelerator proxies can collectively maintain a distributed cluster-wide cache using the local storage subsystems of each of the computing nodes.

In addition to reading data from the object repository using the local object transport accelerator proxies, the local object transport accelerator proxies can facilitate writing data to the object repositories while bypassing the ordinary object storage gateways. In the case of writing data to an object repository in the same AZ as the computing cluster, the local object transport accelerator proxies can first obtain presigned requests to write data directly to the object repositories, similar to the approach described above in relation to reading data. In the case of writing data to an object repository in a different AZ, the local object transport accelerator proxies can first write the data to a temporary location in the same AZ, which can be an object repository in the AZ or another type of storage subsystem. The storage subsystem managing the temporary location in the same AZ can be configured to transfer the data object to the object repository in the different AZ asynchronously at a later time (e.g., according to a data transfer schedule). In some implementations, a data storage management subsystem is configured to initiate the transfer of data between object repositories in different availability zones asynchronously (e.g., at a later time relative to the write request). The data storage management subsystem can update a location record associated with the data object in a location record database. The location record indicates where the data object is stored. For example, the data object can be stored in the local cache, the object repository in the first availability zone (e.g., if the data transfer has not happened yet) or in the object repository in the second availability zone (e.g., if the data transfer is complete). The location record database is accessible to any LOTA proxy of the described system along with the data storage management subsystem to determine the current location(s) of a data object stored in the system.

Particular embodiments of the subject matter described in this specification can be implemented so as to realize one or more of the following advantages. Using local object transport accelerator proxies as described in this specification vastly improves the performance of transporting data within a computing cluster. In some situations, the performance in terms of per-hardware accelerator unit data transfer has been improved by three orders of magnitude or more.

Using the local object transport accelerator proxies to maintain a cluster-wide cache can improve the read performance of data objects that were already read from the object repository. In addition, the cluster-wide cache can be pre-loaded with data while the data is being uploaded to the object repository, which means that the computing cluster can begin execution with a fully loaded cache.

The distributed cache also allows for overall smaller object repositories, because fewer resources need to be allocated on the backend storage to achieve a certain level of performance. The distributed cache allows for the computing cluster storage performance to scale linearly with the size of the computing cluster. The object repository does not need to trust the cache cluster, and thus the object repository can support multiple untrusted cache clusters in parallel, where each cache cluster is separate and untrusted and possibly having a different owner.

The present specification describes techniques of reading data objects retrieved from another AZ in a local distributed cache and writing data objects to object repositories in other AZs by first writing the data objects to an object repository in the same AZ. These techniques overcome wide-area network (WAN) bandwidth limitations (e.g., WAN have maximum data rate limitations) on the read paths of reading cached data and write paths of writing data to an object repository in a different AZ.

The local object transport accelerator proxy and the object repository can be implemented using the same API, and thus from a client perspective, the use of caching is transparent.

The object repository can store data as write-once, read-many (WORM) backend objects and can implement a read-after-write consistency model. The ability to bypass the object storage gateway allows direct access to stored backend objects and the WORM nature of these backend objects.

In an aspect, a system includes a first availability zone (AZ) facility housing a data center. The first AZ facility includes a first plurality of computing nodes, a first object repository, and a second availability zone facility housing a second data center. The second AZ facility includes a second plurality of computing nodes and a second object repository, in which each computing node includes a central processing subsystem comprising one or more central processing units (CPUs), a parallel processing subsystem comprising one or more hardware accelerator units, and a local storage subsystem comprising one or more data storage devices. The central processing subsystem of each computing node is operable to execute software instructions that cause the central processing subsystem to perform operations to coordinate a provisioning of computing workloads to the one or more hardware accelerator units of the parallel processing subsystem of the computing node. The central processing subsystem of each computing node is operable to execute instructions to implement a local object transport accelerator proxy. Each local object transport accelerator proxy in execution is operable to perform operations comprising writing a data object to the second object repository. A data storage management subsystem is operable to determine that the data object is to be transmitted from the second object repository to the first object repository after a time period, the data storage management subsystem is operable to update a location record associated with the data object upon transmission of the data object from the first object repository to the second object repository, the updated location record indicating that the data object is stored in the second object repository.

In some implementations, the time period is determined based on a data transfer schedule.

In some implementations, each local object transport accelerator proxy in execution is operable to transmit the data object to a local storage subsystem. In some implementations, each local object transport accelerator proxy in execution is operable to update a location record associated with the data object in a location record database, the updated location record indicating that the data object is stored in the local storage subsystem.

In some implementations, each local object transport accelerator proxy in execution is operable to determine a storage location of a requested data object based on a corresponding location record associated with the requested data object.

In some implementations, the determined storage location comprises one of a local storage subsystem, the first object repository, and the second object repository.

In some implementations, each local object transport accelerator proxy in execution is operable to receive a presigned request from an object storage gateway associated with the first object repository. In some implementations, the object storage gateway is operable to perform one or more tasks comprising authentication and authorization.

In some implementations, each local object transport accelerator proxy is implemented by a container executed by a container runtime environment.

In an aspect, a method includes receiving a request, from a hardware accelerator unit of a computing node of a computing cluster in a first availability zone facility housing a data center, to write a data object to an object repository in a second availability zone facility housing a second data center. The method includes transmitting the data object to a temporary storage location of the first availability zone. The method includes updating, by a data storage management subsystem, a location record associated with the data object in a location record database. After a time period, the method includes initiating, by the data storage management subsystem, a data transfer of the data object from the temporary storage location to the object repository in the second availability zone and further updating, by the data storage management subsystem, the location record associated with the data object in the location record database.

In some implementations, the method includes transmitting the data object to a local storage subsystem of the computing cluster in the first availability zone, wherein the computing cluster comprises the computing node and updating a location record associated with the data object in the location record database, the updated location record indicating that the data object is stored in the local storage subsystem.

In some implementations, the method includes receiving a request, from another hardware accelerator unit of the computing cluster, to read the data object, and determining, based on the location record associated with the data object, if the data object is stored in one or more of the local storage subsystem, the object repository in the first availability zone associated with an object storage gateway in the first availability zone, or the object repository in the second availability zone associated with an object storage gateway in the second availability zone.

In some implementations, upon determining that the data object is stored in the object repository in the first availability zone, the method includes transmitting a request to the object storage gateway in the first availability zone for a presigned request, receiving the presigned request from the object storage gateway in the first availability zone, and retrieving the data object from the object repository in the first availability zone using the presigned request.

In some implementations, upon determining that the data object is stored in the object repository in the second availability zone, the method includes transmitting a request to the object storage gateway in the second availability zone for a presigned request, receiving the presigned request from the object storage gateway in the second availability zone, and retrieving the data object from the object repository in the second availability zone using the presigned request.

In some implementations, the object storage gateway in the first availability zone is configured to perform one or both of authentication and authorization based on the request for the presigned request.

In some implementations, the time period is determined by a pre-determined data transfer schedule.

In some implementations, the object storage gateway in the first availability zone and the object storage gateway in the second availability zone are each operable to perform one or more respective tasks comprising authorization and authentication.

In some implementations, the method is implemented by a container executed by a container runtime environment.

In an aspect, a system includes a computing cluster comprising a plurality of physical computing nodes. Each computing node includes a central processing subsystem comprising one or more central processing units (CPUs), a parallel processing subsystem comprising one or more hardware accelerator units, and a local storage subsystem comprising one or more data storage devices. The system includes an object repository that is physically separate from each of the plurality of computing nodes. The central processing subsystem of each computing node is operable to execute software instructions that cause the central processing subsystem to perform operations to coordinate the provisioning of computing workloads to the one or more hardware accelerator units of the parallel processing subsystem of the computing node. The central processing subsystem of each computing node of the computing cluster is operable to execute instructions to implement a respective local object transport proxy. Each local object transport proxy in execution is operable to perform operations comprising using presigned requests for retrieving data from the object repository.

In some implementations, the presigned requests are generated by an object storage gateway that is configured to perform authentication and authorization for retrieving data from the object repository.

In some implementations, the operations of the local object transport proxy further include receiving a request for data stored in the object repository, providing a request to the object storage gateway for a presigned access location, and retrieving the data from the object repository using the presigned access location.

In some implementations, retrieving the data from the object repository comprises using a data path that bypasses the object storage gateway.

In some implementations, the computing nodes and the local object transport proxies of the computing cluster are untrusted entities for the object repository.

In some implementations, the object repository services multiple different untrusted computing clusters. In some implementations, the object repository services multiple different untrusted computing clusters having different owners.

In some implementations, the plurality of local object transport proxies in execution on the plurality of computing nodes collectively maintain a cluster-wide cache using each local storage subsystem of each physical computing node to cache data retrieved from the object repository.

In some implementations, maintaining the cluster-wide cache includes receiving, by a local object transport proxy on a first computing node, a request from a hardware accelerator unit of the first computing node for a data object, determining, by the local object transport proxy, that the data object exists in the cluster-wide cache, and retrieving, by the local object transport proxy, the data object from the cluster-wide cache.

In some implementations, the cluster-wide cache is a distributed cache that is configured to store portions of data objects within the local storage subsystems of multiple physical computing nodes.

In some implementations, retrieving the data object from the cluster-wide cache comprises retrieving a plurality of portions of the data object from the local storage subsystems of multiple physical computing nodes. In some implementations, retrieving portions of the data object from multiple physical computing nodes comprises a first local object transport proxy of a first computing node providing a request for a portion of a data object to a second local object transport proxy executing on a node on which the portion of the data object is stored.

In some implementations, maintaining the cluster-wide cache includes determining that another data object does not exist in the cluster-wide cache and retrieving, by the local object transport proxy, the other data object from an object repository of the computing cluster and providing the other data object to the requesting hardware accelerator unit.

In some implementations, maintaining the cluster-wide cache further comprises storing the other data object in the cluster-wide cache. In some implementations, storing the other data object in the cluster-wide cache comprises distributing portions of the other data object among multiple computing nodes.

In some implementations, the local object transport proxy is a software module that executes in a container hosted by container environment executed by the central processing subsystem.

In some implementations, maintaining the cluster-wide cache includes receiving an initial data upload request to store a plurality of data objects in the object repository, and while receiving and storing the plurality of data objects in the object repository, preloading the cache with the plurality of data objects until the cache reaches a maximum capacity.

In some implementations, preloading the cache includes receiving the data objects in portions and distributing the received portions of the data objects across the local storage subsystems of the cluster-wide cache. In some implementations, distributing the received portions of the data objects comprises distributing the received portions of the data objects without reassembling each data object.

In some implementations, the local object transport proxy is a software module that executes in a container hosted by container environment executed by the central processing subsystem.

In an aspect, a system includes a computing cluster a plurality of physical computing nodes, in which each computing node includes a central processing subsystem comprising one or more central processing units (CPUs), a parallel processing subsystem comprising one or more hardware accelerator units, and a local storage subsystem comprising one or more data storage devices. The system includes an object repository that is physically separate from each of the plurality of computing nodes. The central processing subsystem of each computing node is operable to execute software instructions that cause the central processing subsystem to perform operations to coordinate the provisioning of computing workloads to the one or more hardware accelerator units of the parallel processing subsystem of the computing node. The central processing subsystem of each computing node of the computing cluster is operable to execute instructions to implement a respective local object transport proxy. The plurality of local object transport proxies in execution on the plurality of computing nodes collectively maintain a cluster-wide cache using each local storage subsystem of each physical computing node to cache data retrieved from the object repository.

In some implementations, maintaining the cluster-wide cache includes receiving, by a local object transport proxy on a first computing node, a request from a hardware accelerator unit of the first computing node for a data object, determining, by the local object transport proxy, that the data object exists in the cluster-wide cache, and retrieving, by the local object transport proxy, the data object from the cluster-wide cache.

In some implementations, the cluster-wide cache is a distributed cache that is configured to store portions of data objects within the local storage subsystems of multiple physical computing nodes.

In some implementations, retrieving the data object from the cluster-wide cache comprises retrieving a plurality of portions of the data object from the local storage subsystems of multiple physical computing nodes.

In some implementations, retrieving portions of the data object from multiple physical computing nodes comprises a first local object transport proxy of a first computing node providing a request for a portion of a data object to a second local object transport proxy executing on a node on which the portion of the data object is stored.

In some implementations, maintaining the cluster-wide cache includes determining that another data object does not exist in the cluster-wide cache and retrieving, by the local object transport proxy, the other data object from an object repository of the computing cluster and providing the other data object to the requesting hardware accelerator unit.

In some implementations, maintaining the cluster-wide cache further comprises storing the other data object in the cluster-wide cache. In some implementations, storing the other data object in the cluster-wide cache comprises distributing portions of the other data object among multiple computing nodes.

In some implementations, maintaining the cluster-wide cache includes receiving an initial data upload request to store a plurality of data objects in the object repository, and while receiving and storing the plurality of data objects in the object repository, preloading the cache with the plurality of data objects until the cache reaches a maximum capacity.

In some implementations, preloading the cache includes receiving the data objects in portions and distributing the received portions of the data objects across the local storage subsystems of the cluster-wide cache.

In some implementations, distributing the received portions of the data objects comprises distributing the received portions of the data objects without reassembling each data object.

In some implementations, each local object transport proxy is operable to request data from the object repository of the computing cluster using a data path that bypasses an object storage gateway.

In some implementations, each local object transport proxy in execution is operable to use presigned requests for retrieving data from the object repository. In some implementations, each hardware accelerator unit provides requests to the local object transport proxy using a same communication protocol used by the object storage gateway. In some implementations, the presigned requests are generated by an object storage gateway that is configured to perform authentication and authorization for retrieving data from the object repository.

In some implementations, the operations of the local object transport proxy further include receiving a request for data stored in the object repository, providing a request to the object storage gateway for a presigned access location, and retrieving the data from the object repository using the presigned access location.

In some implementations, retrieving the data from the object repository comprises using a data path that bypasses the object storage gateway. In some implementations, the computing nodes and the local object transport proxies of the computing cluster are untrusted entities for the object repository. In some implementations, the object repository services multiple different untrusted computing clusters. In some implementations, the object repository services multiple different untrusted computing clusters having different owners.

In some implementations, the local object transport proxy is a software module that executes in a container hosted by container environment executed by the central processing subsystem.

In an aspect, one or more non-transitory computer readable media storing instructions that, when executed by at least one processor, cause the at least one processor to perform operations including any of the preceding operations.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3 is a flow diagram of an example process for reading a data object from a cluster-wide cache.

FIG. 5 is a flow diagram of an example process for maintaining a cluster-wide cache.

FIG. 6 illustrates an example system that includes a computing cluster in a first availability zone and a computing cluster in a second availability zone.

FIG. 8 is a flow diagram of an example process for writing data to an object repository in a different availability zone.

Like reference numbers and designations in the various drawings indicate like elements.

DETAILED DESCRIPTION

Figure 1:
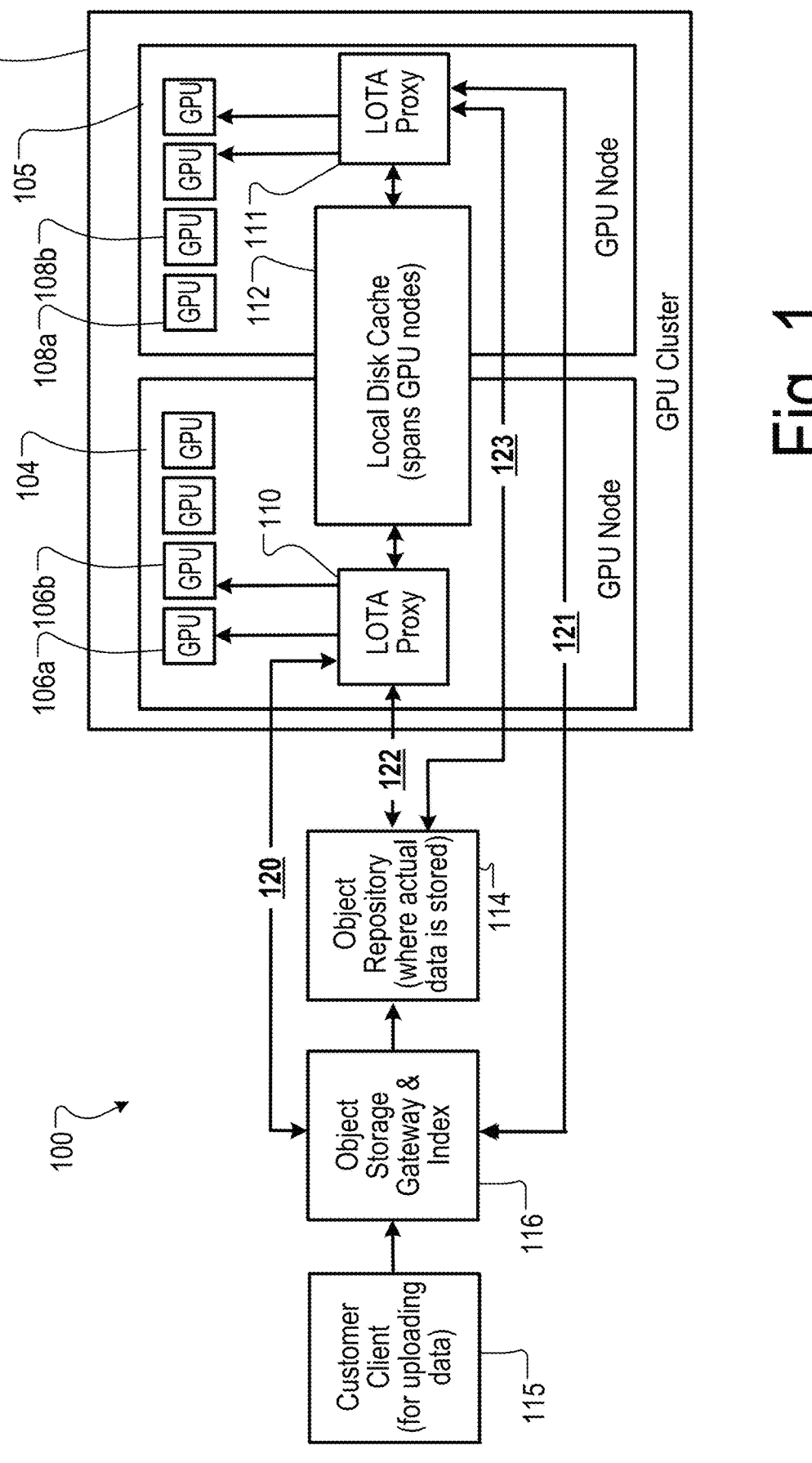
FIG. 1 illustrates an example system that includes a computing cluster and a local object transport accelerator proxy.

This specification describes how a computing cluster can implement a local object transport accelerator (LOTA) proxy on each computing node of a computing cluster. The implementation of the LOTA proxy on a computing node speeds up a process of transporting data objects to and from hardware accelerator units (e.g., GPUs) working on a task. The LOTA proxies can effectively bypass ordinary object storage gateways for retrieving and writing data objects from and to a large-scale object repository by receiving presigned requests from an object storage gateway and directly interacting with the object repository. The LOTA proxies facilitate reading and writing data objects for a local storage subsystem (e.g., a cluster-wide cache) and an object repository with minimal replication of data objects between the data storage locations.

In this specification, a computing node is a physical device that includes multiple co-located subsystems. Being co-located means that these subsystems are in close physical proximity and are controlled by a same central processing subsystem that includes one or more physical central processing units (CPUs). A computing node also includes a parallel processing subsystem having one or more hardware accelerator units, which can be any appropriate device having processing elements that are able to be executed in parallel, for example, a GPU, a TPU, an NPU, an FPGA, or an ASIC that provides such functionality. A computing node also includes a local storage subsystem (e.g., a local disk cache, or a cluster-wide cache) having one or more data storage devices, for example, one or more solid state disk drives.

A computing cluster configured to execute a particular computing task includes multiple computing nodes. In some cases, the computing cluster can access a large-scale object repository for storing underlying data objects for the computing task. The object repository is typically physically separate from each of the computing nodes and typically stores vastly higher volumes of data than the local storage subsystems of the computing cluster. The object repository itself is a computing subsystem that can maintain data in a distributed storage system having multiple underlying volatile or nonvolatile storage devices.

Uploading data objects to the object repository of a computing cluster typically requires sending data through an object storage gateway that handles overhead administrative tasks, which can for example relate to authentication and authorization. The object storage gateway can also perform an indexing process in order to keep track of where data objects are stored in the object repository, e.g., by storing indexing information in a database local to the object storage gateway.

The techniques described in this specification illustrate how the LOTA proxies can use the presigned requests generated by the object storage gateway for the purposes of authorization and authentication and can then obtain data objects directly from the object repository and write data objects to the object repository. The presigned requests can specify a presigned access location, e.g., a particular URL, in the system as a signature to be used for verification. The object repository can then verify the presigned requests using their signatures before retrieving data objects or writing data objects. The data of the data object itself is typically many orders of magnitude larger than the network traffic of getting the presigned request data as well as verifying the presigned requests, and thus, transporting the data objects directly between the object repository and the LOTA proxies while bypassing the object storage gateway maintains access controls while significantly reducing data transfer overhead.

Each LOTA proxy can be implemented by software executed by the central processing subsystem of each computing node. In some implementations, each LOTA proxy is implemented by a container executed by a container runtime environment.

Each LOTA proxy of a computing node receives requests for data objects from hardware accelerator units (e.g., GPUs) belonging to the same computing node. The LOTA proxy can then retrieve the data from a cluster-wide cache (e.g., the local storage subsystem) if the data is stored there. In order to determine which computing node is storing a portion of a data object, the LOTA proxies can use any appropriate hashing algorithm, e.g., rendezvous hashing, that helps to distribute the load of reading cached data objects among the computing nodes of the cluster. Retrieving the data object from the cluster-wide cache can eliminate the need for the data to be retrieved from the object repository at all. In addition, distributing the cluster-wide cache among N computing nodes scales up the aggregate cluster-wide cache capacity by a factor of N. The rendezvous hashing algorithm is of a consistent type, such that disruption is minimized upon changes in the hash targets (e.g., ownership reshuffling upon network topology changes). For example, when a computing node is added or removed, only a small subset of hashed keys need to be reassigned, allowing for flexible scaling of the computing nodes without large overhead.

If the data object does not belong in the cluster-wide cache, a LOTA proxy can directly access the object repository to retrieve it, which in this context can include using a presigned request while bypassing an object storage gateway. In some implementations, a first LOTA proxy identifies the node to which the data object belongs, e.g., using an appropriate hashing algorithm, and then sends a request to a second LOTA proxy executing on that node to handle retrieving the data from the object repository. Each LOTA proxy of the computing cluster is operable to use a similar appropriate hashing algorithm to identify ownership of the data object independently, without cross-cluster consensus between computing nodes, thus reducing latency of data retrieval. This arrangement, once appropriately configured, allows the LOTA proxies to bypass the overhead of requesting objects through the object storage gateway. After retrieving the data object from the object repository, a LOTA proxy can provide the retrieved data to the requesting hardware accelerator unit as well as storing the data object in the cluster-wide cache on the same computing node or another computing node, which can include distributing portions of the data object among multiple computing nodes or requesting that other proxies on other nodes retrieve and cache portions of the data.

FIG. 1 illustrates an example system 100 that includes a LOTA proxy 110 for a computing node 104 of an example computing cluster 102. The example computing cluster 102 includes two computing nodes (the computing node 104 and a computing node 105).

The computing node 104 includes the LOTA proxy 110 that is communicatively coupled to one or more hardware accelerator units (e.g., GPUs). The LOTA proxy 110 is communicatively coupled to GPU 106*a* and GPU 106*b*. The example system 100 depicts hardware accelerators as GPUs but other computing devices, including CPUs, can be assigned to perform computational tasks and configured to receive instructions from the LOTA proxy 110.

The LOTA proxy 110 is configured to mediate data transmission between the GPUs 106*a-b* and an object repository 114 and a cluster-wide cache 112. In typical systems, the computing node 104 accesses data from the object repository 114 via an object storage gateway 116. The present specification describes a method for the computing node 104 to access data directly from the object repository 114 by implementing the LOTA proxy 110 executed on the computing node 104 without the data traversing the object storage gateway 116.

The LOTA proxy 110 is communicatively coupled to the object storage gateway 116 via data path 120. The LOTA proxy 110 can transmit a message (e.g., a data packet, a request over an application programming interface (API), etc.) to the object storage gateway 116 to initiate a read or write operation to or from the object repository 114. The object storage gateway 116 can execute one or more instructions associated with authentication, authorization, among other possible instructions. The object storage gateway 116 returns a presigned request to the LOTA proxy 110. The presigned request includes information that indicates the LOTA proxy 110 (and the associated computing node 104) is authorized and properly authenticated to read or write the data to or from the object repository 114. In some implementations, the object storage gateway 116 returns a set of more than one presigned requests to the LOTA proxy 110.

In some implementations, during a read operations from the object repository 114, the object storage gateway 116 returns the requested data object if the requested data object meets is below a certain data storage threshold. In some cases, read operations do not benefit from the system bypassing the object storage gateway 116 during the read operations, and the object storage gateway 116 can determine it is more efficient to directly return the requested data object instead of the one or more presigned requests to the LOTA proxy 110.

The LOTA proxy 110 transmits the presigned request via data path 122 to the object repository 114. In the case of a read operation, the object repository 114 returns the data directly to the LOTA proxy 110 without returning the data through the object storage gateway 116. In the case of a write operation, the object repository 114 receives the data to be written with the presigned request and writes the data to the object repository 114 without the data to be written traversing the object storage gateway 116.

The computing node 105 also includes a LOTA proxy 111 that is communicatively coupled to hardware accelerator units (e.g., GPU 108*a* and GPU 108*b*). The LOTA proxy 111 is communicatively coupled to the object repository 114 via data path 123 and to the object storage gateway via data path 121. The LOTA proxy 111 can execute operations similar to those described in relation to the LOTA proxy 110 for reading and writing data objects to the object repository 114 with presigned requests retrieved from the object storage gateway 116.

In some implementations, a customer client 115 loads data to be accessed by the computing nodes via the object storage gateway 116 to the object repository 114. For example, a user can load data associated with neural network model weights, training data, etc. Once the data is loaded into the object repository 114 via the object storage gateway 116, the LOTA proxies of the computing cluster 102 can implement the methods described above to quickly access and augment the loaded data.

The computing cluster 102 includes the cluster-wide cache 112 that can store data previously read from the object repository 114 for fast access by one of the nodes of the computing cluster 102 at a later time. In addition, the system 100 can initiate a pre-loading of data from the object repository 114 into the cluster-wide cache 112 if it is known before a calculation that a particular set of data will be required (e.g., weights of a neural network layer). For example, the LOTA proxy 110 can access a particular set of data from the object repository 114 using a presigned request, as described above, or from the cluster-wide cache 112. Similarly, the LOTA proxy 111 can access a particular set of data from the object repository 114 using a presigned request or from the cluster-wide cache 112.

Figure 2:
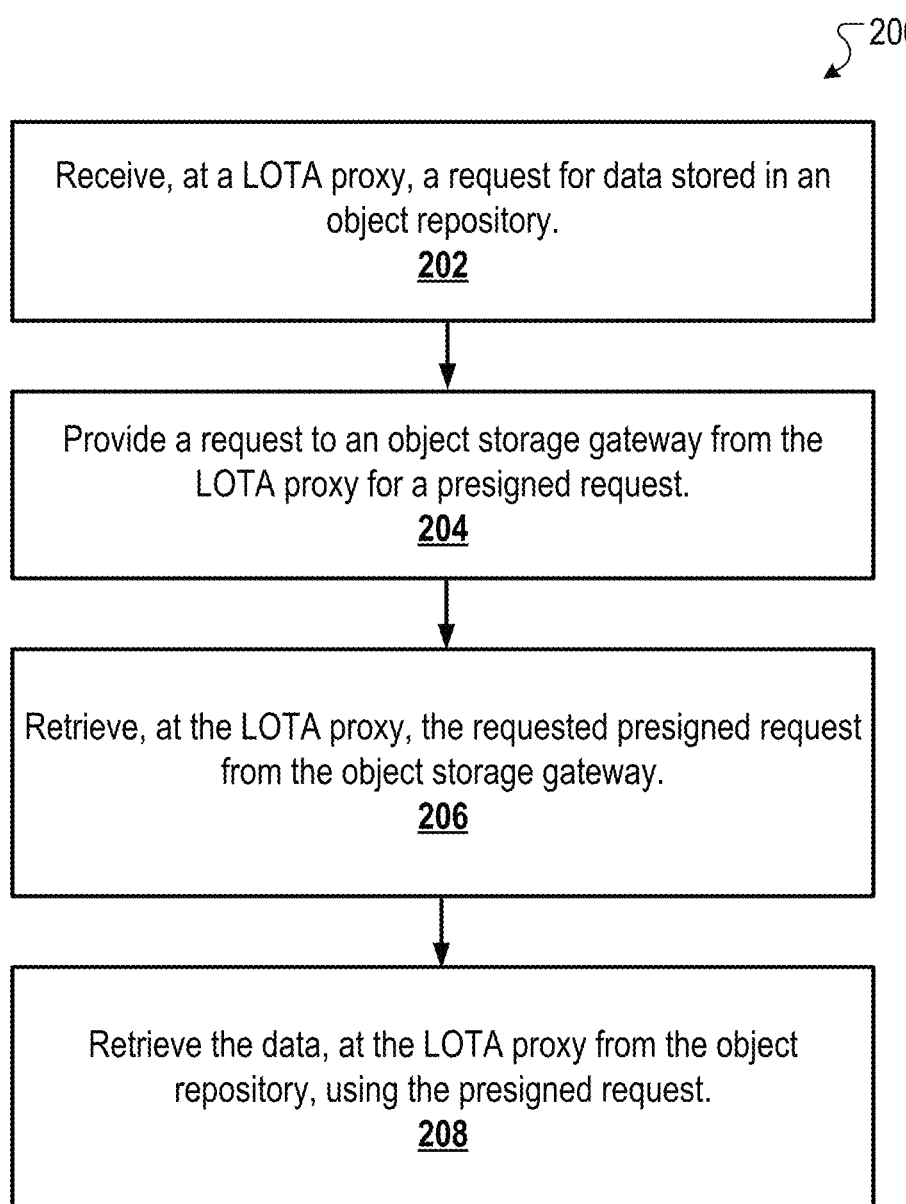
FIG. 2 is a flow diagram of an example process for reading a data object from an object repository.

FIG. 2 is a flow diagram of an example process 200 for reading a data object from an object repository. The example process 200 can be implemented by a system similar to the system 100 as described in relation to FIG. 1. The system includes at least one computing cluster (e.g., the computing cluster 102) with at least one computing node (e.g., the computing node 104). The at least one computing node includes at least one processor (e.g., a processor of a central processing subsystem) that executes instructions associated with a LOTA proxy (e.g., the LOTA proxy 110) and has access to a cluster-wide cache (e.g., the cluster-wide cache 112). The LOTA proxy can request to read data from an object repository (e.g., the object repository 114) and is communicatively coupled to an object storage gateway (e.g., the object storage gateway 116) associated with the object repository.

The system receives (202), at a LOTA proxy, a request for data stored in an object repository. In some cases, the LOTA proxy receives the request from a hardware accelerator unit like a GPU. In some cases, the requested data is associated with a layer of a neural network, and the GPU is assigned a processing task of processing the requested data. In some implementations, the LOTA proxy queries the cluster-wide cache to determine if the requested data is available. For example, if a previous data request returned the requested data, the requested data can already be stored in the cluster-wide cache for efficient access.

The LOTA proxy is implemented by a central processing subsystem of each computing node of a computing cluster. In some implementations, the LOTA proxy is a software module that executes in a container hosted by a container environment executed by the central processing subsystem. In addition to implementing operations of the LOTA proxy, the central processing subsystem is operable to execute software instructions that cause the subsystem to perform operations to coordinate the provisioning of computing workloads to the one or more hardware accelerator units of a parallel processing subsystem (e.g., multiple hardware accelerators like GPUs) of the computing node.

In some implementations, the object repository services multiple different untrusted computing clusters. In some implementations, the object repository services multiple different untrusted computing clusters having different owners.

The system provides (204) a request to an object storage gateway from the LOTA proxy for a presigned request (e.g., a presigned access location). In some implementations, the transmitted request includes authentication data and/or authorization data, along with information about the requested data (e.g., a storage location of the requested data). In some implementations, the object storage gateway is configured to perform authentication and authorization for retrieving the data from the object repository.

The system retrieves (206), at the LOTA proxy, the requested presigned request from the object storage gateway (e.g., a URL pointing to the presigned access location where the data object is stored). The presigned request allows the LOTA proxy to communicate directly with the object repository while bypassing the object storage gateway, and avoiding the latency introduced by operations performed by the object storage gateway while transferring the data to the computing node.

The system retrieves (208) the data at the LOTA proxy from the object repository, using the presigned request. The LOTA proxy retrieves the data from the object repository using a data path that bypasses the object storage gateway. In some implementations, computing nodes of the computing cluster and the LOTA proxies of the computing cluster are untrusted entities for the object repository.

In addition to retrieving the requested data from the object repository, the LOTA proxy can retrieve that requested data from a cluster-wide cache, via local storage subsystems (e.g., local disk cache) of the computing nodes. In some cases, the computing cluster includes multiple computing nodes, each with a respective LOTA proxy. Each LOTA proxy collectively maintains the cluster-wide cache using each local storage subsystem of each physical computing node of the computing cluster to cache data retrieved from the object repository.

FIG. 3 is a flow diagram of an example process 300 for reading a data object from a cluster-wide cache. The example process 300 can be implemented by a system similar to the system 100 as described in relation to FIG. 1.

The system receives (302), by the LOTA proxy on a first computing node, a request from a hardware accelerator unit of the first computing node for a data object. The system determines (304), by the LOTA proxy, that the data object exists in the cluster-wide cache. The system retrieves (306), by the LOTA proxy, the data object from the cluster-wide cache. The data access from the cluster-wide cache (e.g., a local storage subsystem) allows for faster access to previously accessed or pre-loaded data in comparison with retrieving the data from the object repository.

In some implementations, the cluster-wide cache is a distributed cache that is configured to store portions of data objects within local storage subsystems of multiple physical computing nodes. In some implementations, retrieving the data object from the cluster-wide cache includes retrieving multiple portions of the data objects within the local storage subsystems of multiple physical computing nodes. In some implementations, retrieving portions of the data object from multiple physical computing nodes includes a first LOTA proxy of the first computing node providing a request for a portion of a data object to a second LOTA proxy executing on a node on which the portion of the data object is stored.

Figure 4:
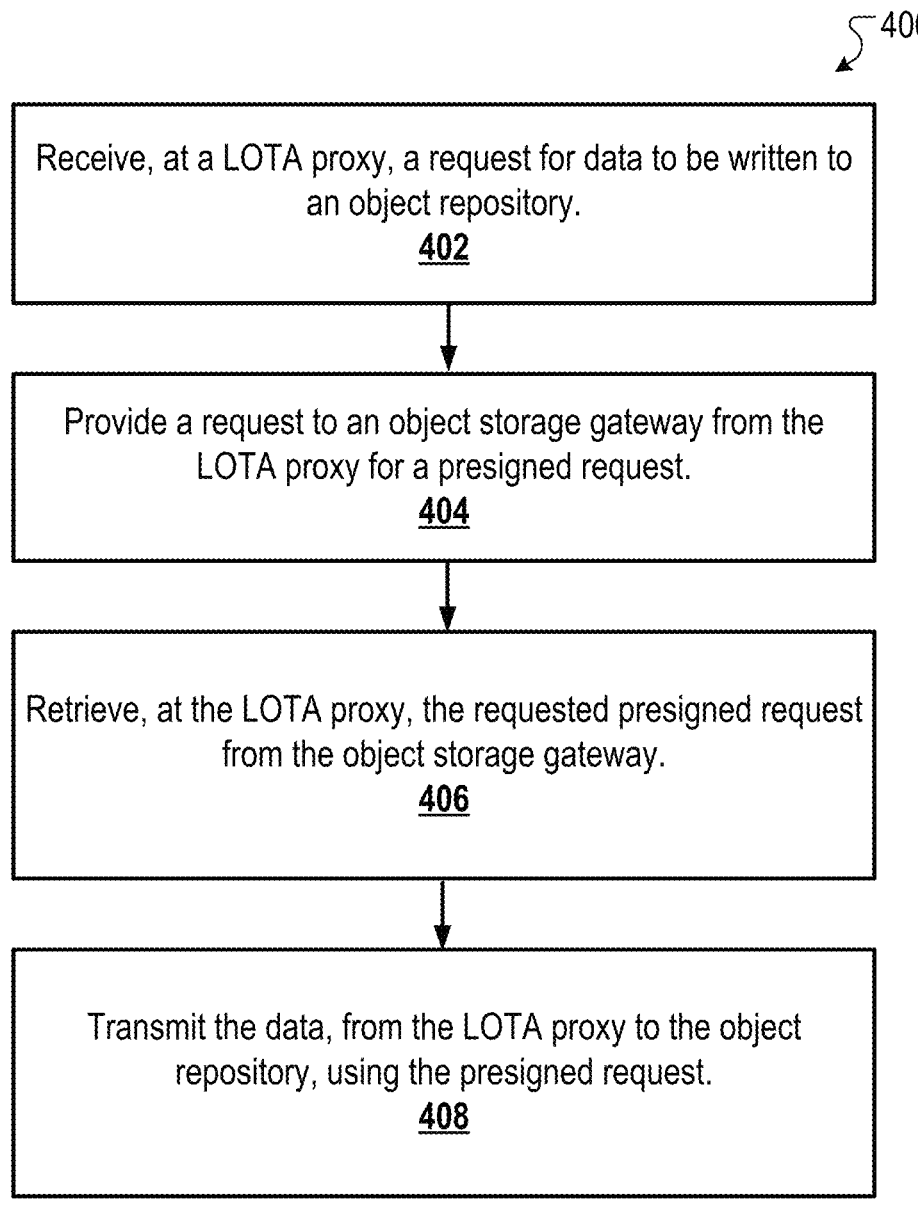
FIG. 4 is a flow diagram of an example process for writing a data object to an object repository.

FIG. 4 is a flow diagram of an example process 400 for writing a data object to an object repository. The example process 400 can be implemented by a system similar to the system 100 as described in relation to FIG. 1. The system includes elements described in relation to the system described above in relation to execution of the example processes 200 and 300.

The system receives (402), at a LOTA proxy, a request for data to be written to an object repository. In some cases, the LOTA proxy receives the request from a hardware accelerator unit like a GPU. In some cases, the data to be written is an intermediate result of a neural network processing task. In some other cases, the data to be written is a final result of a data processing task (e.g., an output of a neural network layer). In some implementations, the LOTA proxy writes the data to be written to the local disk cache to be quickly accessed at a later time without querying the object storage gateway and the object repository.

The system provides (404) a request to an object storage gateway from the LOTA proxy for a presigned request (e.g., a presigned access location). In some implementations, the transmitted request includes authentication data and/or authorization data, along with information about the data to be written (e.g., target storage location, data storage policies, etc.). In some implementations, the object storage gateway is configured to perform authentication and authorization for writing the data to the object repository.

The system retrieves (406), at the LOTA proxy, the requested presigned request from the object storage gateway. The presigned request can specify a presigned write location, e.g., a particular URL, in the system as a signature to be used for verification. The presigned request allows the LOTA proxy to communicate directly with the object repository while bypassing the object storage gateway, and avoiding the latency introduced by operations performed by the object storage gateway during data transfer.

The system transmits (408) the data, from the LOTA proxy to the object repository, using the presigned request. The LOTA proxy writes the data to the object repository using a data path that bypasses the object storage gateway. In some implementations, computing nodes of the computing cluster and the LOTA proxies of the computing cluster are untrusted entities for the object repository. In some implementations, upon retrieving the data, the data is stored in the cluster-wide cache.

FIG. 5 is a flow diagram of an example process 500 for maintaining a cluster-wide cache. The example process 500 can be implemented by a system similar to the system 100 as described in FIG. 1.

The system receives (502), by a LOTA proxy on a first computing node, a request from a hardware accelerator unit (e.g., GPU) of the first computing node for a data object. The system determines (504), by the LOTA proxy, that the data object exists in the cluster-wide cache. The system retrieves (506), by the LOTA proxy, the data object from the cluster-wide cache.

In some implementations, the cluster-wide cache is a distributed cache that is configured to store portions of data objects within local storage subsystems of multiple physical computing nodes. In these cases, retrieving a data object from the cluster-wide cache includes retrieving the multiple portions of the data object from the local storage subsystems of the multiple physical computing nodes. To accomplish this, a first LOTA proxy of a first computing node can provide a request for a portion of a data object to a second LOTA executing on a computing node on which the portion of the data object is stored.

The system determines (508) that another data object does not exist in the cluster-wide cache. The system retrieves (510), by the LOTA proxy, the other data object from an object repository of the cluster and provide the other data object to the requesting hardware accelerator unit. Upon retrieving the other data object, the LOTA proxy stores (512) the other data object in the cluster-wide cache. This can speed up future access to the other data object by a computing node of the cluster. The storing of the other data object can include distributing portions of the other data object among multiple computing units of the cluster.

In some implementations, maintaining the cluster-wide cache includes receiving an initial data upload request to store multiple data objects in the object repository and while receiving and storing the multiple data objects in the object repository, preloading the cache with the multiple data objects until the cache reaches a maximum capacity. This can be helpful in scenarios in which it is known that a particular set of data objects will be accessed by the computing nodes in an upcoming calculation, as access to the data objects from the cluster-wide cache is faster than access to the data objects from the object repository. The preloading of the cache can include receiving the data objects in portions and distributing the received portions of the data objects across the local storage subsystems of the cluster-wide cache. In some implementations, distributing the received portions of the data objects includes distributing the received portions of the data objects without reassembling each data object.

The cluster-wide cache allows for overall smaller object repositories, because fewer resources need to be allocated to the object repository to achieve a certain level of performance. The object repository does not need to trust the cluster-wide cache, and thus the object repository can support multiple untrusted cluster-wide caches in parallel, where each cluster-wide cache is separate and untrusted and possibly having a different owner.

FIGS. 1-5 are related to a scenario in which the computing cluster and the object repository are located in the same data center (e.g., same facility). The requests for accessing data stored in the object repository and the requests for writing data objects to the object repository do not necessitate transmitting data over a network external to the data center. In a scenario, as described below, in which computing nodes of a computing cluster in a first data center communicate with an object repository in a second data center, additional modifications to the previously described system and methods can be implemented.

For example, if a computing node of a computing cluster requests a data object that does not belong to the cluster-wide cache or an object repository within the availability zone to which the cluster belongs, a LOTA proxy of the computing node can directly access the data object from an object repository in a different availability zone. The LOTA proxy can request a presigned request from an object storage gateway in the different availability zone. The process for accessing the data object in the different availability zone is similar to the process for accessing a data object in the same availability zone. The presigned request will include information associated with a storage location of the requested data object. The process for writing a data object to an object repository in the different availability zone will be described in detail below.

Figure 6:
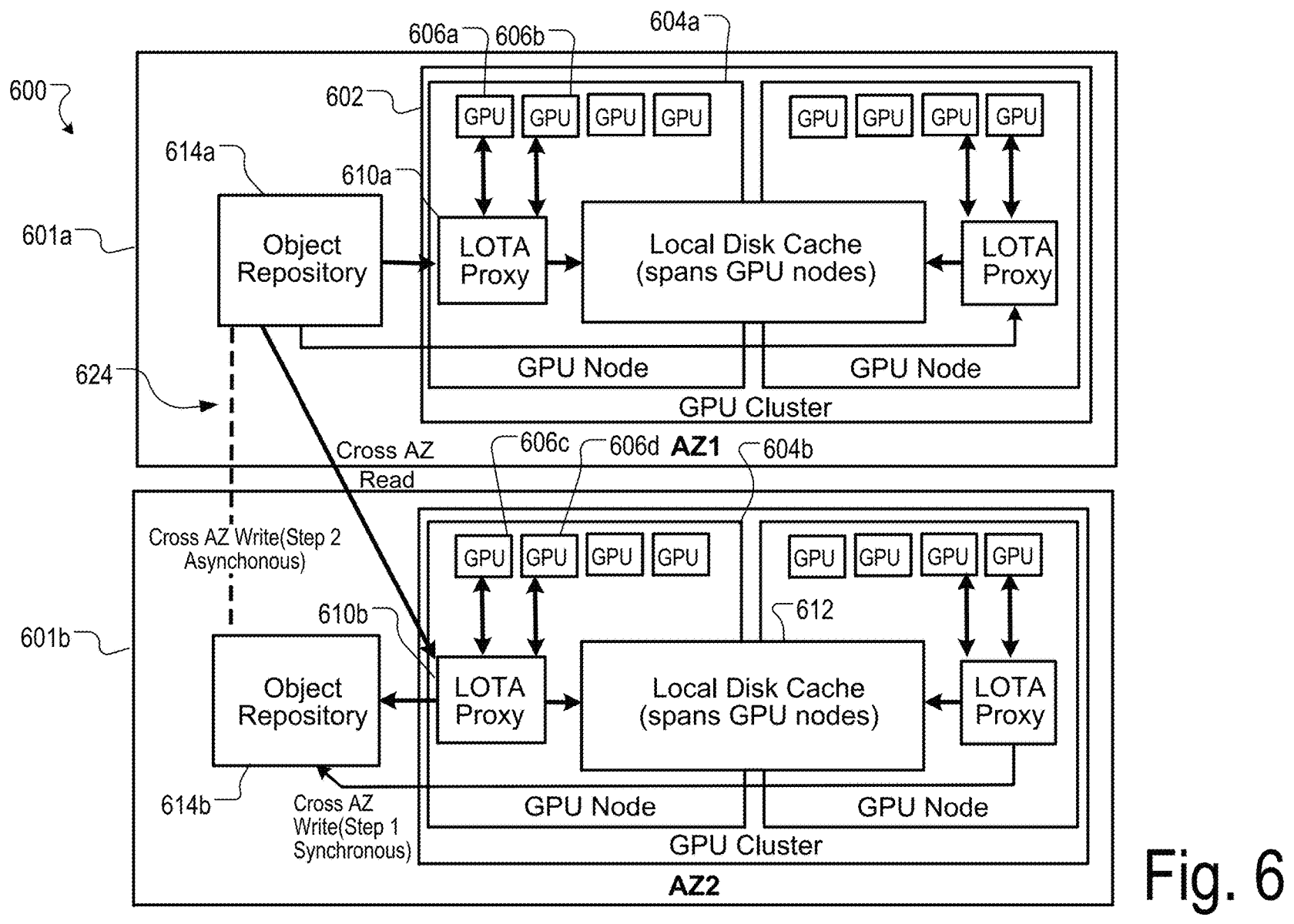

FIG. 6 illustrates an example system 600 that includes a computing cluster 602, an object repository 614a located in a first AZ 601a. The system 600 includes a second AZ 601b with an object repository 614b. The example system 600 illustrates connections between components for implementing a LOTA proxy (e.g., a LOTA proxy 610b associated with a computing node 604b and a LOTA proxy 610a associated with a computing node 604a) located in the first AZ 601b to write data to the object repository 614a located in the first AZ 601a.

The LOTA proxies 610a-b are each implemented by a respective central processing subsystem (e.g., one or more CPUs) of each computing node. The central processing subsystems are operable to execute instructions to implement the LOTA proxies 610a-b. For example, the instructions can include generating and transmitting requests to an object storage gateway (not illustrated in FIG. 6) associated with an object repository and transmitting a data object to the object repository using a presigned request received from the object storage gateway, similar to the process described in relation to FIGS. 1-5.

In addition to executing instructions associated with the LOTA proxies 610a-b, the central processing subsystems are operable to execute software instructions that cause the central processing subsystems to perform operations to coordinate a provisioning of computing workloads to hardware accelerators (e.g., GPUs 606a-d). In some cases, the GPUs 606a-d are part of a parallel processing subsystem of a respective computing node.

To write a data object from the computing node 604b to the object repository 614a, the LOTA proxy 610b first facilitates a temporary storage of the data object in the first AZ 601b. In some implementations, the object repository 614b provides the temporary storage. In some implementations, the cluster-wide cache (local disk cache) 612 provides the temporary storage. In general, any storage device located within the second AZ 601b and accessible to the computing nodes within the second AZ 601b can provide the temporary storage of the data object.

In the case in which the temporary storage is provided by the object repository 614b, the LOTA proxy 610b receives a presigned request from the object storage gateway associated with the object repository 614b and uses the presigned request to transmit data to be temporarily stored in the object repository 614b in the second AZ 601b.

After a time period, the system 600 is configured to transmit the data object temporarily stored by a data storage device in the second AZ 601b to the object repository 614a of the first AZ 601a. The example implementation illustrated in FIG. 6 illustrates a data path 624 in which the data object is asynchronously transmitted from the object repository 614b to the object repository 614a.

If a GPU of a computing node (e.g., the computing node 604b) submits a read request for the data object that was temporarily written to the object repository 614b but will ultimately be stored in the object repository 614a, and the read request is received before the data is asynchronously transmitted to the object repository 614a, the LOTA proxy 410b can retrieve the data from the object repository 614b. A GPU can receive requested data in response to the read request from the cluster-wide cache 612, the object repository 614b (if the asynchronous transmission has not occurred yet), or the object repository 614a (if the asynchronous transmission has occurred).

Figure 7:
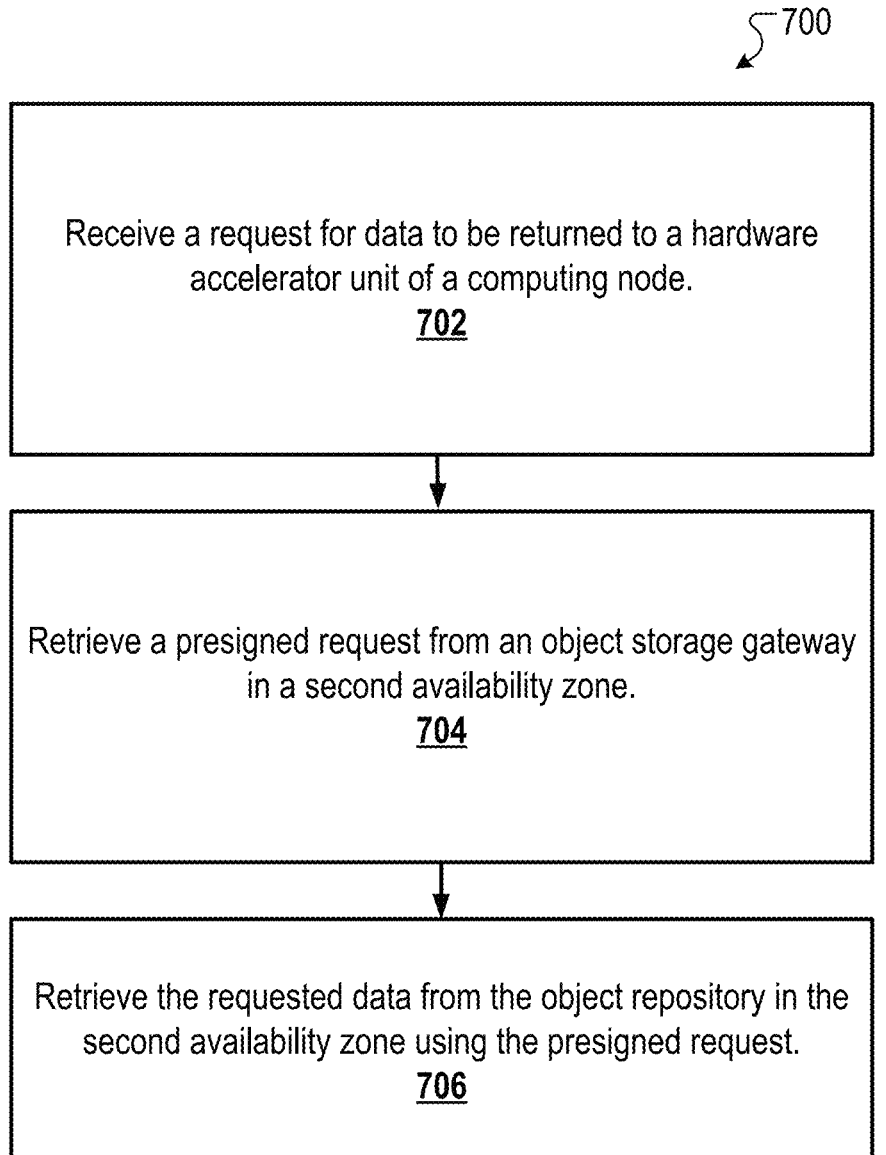
FIG. 7 is a flow diagram of an example process for reading data to an object repository in a different availability zone.

FIG. 7 is a flow diagram of an example process 700 for reading data from an object repository in a different availability zone. The example process 700 can be implemented by components of a system similar to the system 600 as described in relation to FIG. 6. The system includes a first availability zone and a second availability zone. Each availability zone represents a distinct facility housing a data center and can include multiple computing clusters and object repositories.

A LOTA proxy of a computing node of a computing cluster in the first availability zone receives (702) a request for data to be returned to a hardware accelerator unit (e.g., GPU) of the computing node. In some cases, the requested data is stored in a cluster-wide cache in the first availability zone that is accessible to the computing nodes of the computing cluster in the first availability zone. If this is the case, the LOTA proxy can retrieve the requested data from the cluster-wide cache and return it to the requesting hardware accelerator unit. In addition or alternatively, the requested data can be stored in an object repository in the first availability zone, as described in relation to the example process 200. In addition or alternatively, the requested data can be stored in an object repository in the second availability zone.

In the case that the requested data is stored in the object repository in the second availability zone, the LOTA proxy (located in the first availability zone) retrieves (704) a presigned request from an object storage gateway in the second availability zone. In some implementations, the system transmits a request to retrieve the presigned request to the object storage gateway in the second availability zone that includes authentication data and/or authorization data, along with information about the requested data (e.g., a storage location in the object repository in the second availability zone of the requested data).

The LOTA proxy retrieves (706) the requested data from the object repository in the second availability zone using the presigned request.

FIG. 8 is a flow diagram of an example process 800 for writing data to an object repository in a different availability zone. The example process 800 can be implemented by a system similar to the system 600 as described in relation to FIG. 6. The system includes a first availability zone and a second availability zone. Each availability zone represents a distinct facility housing a data center and can include multiple computing clusters and object repositories.

A LOTA proxy of a computing node of a computing cluster in the first availability zone receives (802) a request, from a hardware accelerator unit of a computing node of a computing cluster in a first availability zone facility housing a data center, to write a data object to an object repository in a second availability zone facility housing a second data center. In some cases, the data object to be written is an intermediate result of a data processing task. In some other cases, the data object to be written is a final result of a data processing task (e.g., an output of a neural network layer). In some implementations, the LOTA proxy writes the data object to a cluster-wide cache to be quickly accessed at a later time without communicating with an object storage gateway and object repository. In some implementations, computing tasks are distributed across computing clusters located across multiple availability zones. In some implementations, data objects related to the computing tasks (e.g., neural network model weights, machine learning model training data, etc.) are located centrally in one availability zone. The example process 800 enables fast data object writes to the centrally located object repository from any availability zone.

The LOTA proxy transmits (804) the data object to a temporary storage location of the first availability zone. In some implementations, the temporary storage location is a cluster-wide cache, an object repository, or another storage device located in the first availability zone. In the case that the temporary storage location is an object repository in the first availability zone, the LOTA proxy retrieves a presigned request from an object storage gateway in the first availability zone. The object storage gateway in the first availability zone is configured to return the presigned request after performing various administrative operations (e.g., authentication, caching, authorization, etc.). The LOTA proxy transmits the presigned request to the object repository in the first availability zone along with the data to be written (ultimately to the object repository in the second availability zone). However, the LOTA proxy first transmits the data to be written to be temporarily stored in the object repository in the first availability zone.

The temporary storage of the data object in the first availability zone allows for faster writes in comparison with writing the data object directly to the object repository in the second availability zone. The data to be written is often large (e.g., an output activation of a neural network layer), and depending on how close the facility associated with the first availability zone is to the facility associated with the second availability zone, even a direct write with a presigned request to the object repository in the second availability zone can experience significant latency due to data routing between the two facilities. By temporarily storing the data to be written (e.g., in the object repository within the same availability zone), the processing units can write the data object quickly and resume subsequent data processing tasks (e.g., calculation associated with a subsequent neural network layer).

In some implementations, the temporary storage of the data object is implemented by a storage device other than the object repository in the first availability zone. For example, the cluster-wide cache of the computing cluster in the first availability zone can temporarily store the data object (as long as the data object fits within available memory of the cluster-wide cache).

Upon transmitting the data object to the temporary storage location in the first availability zone, a data storage management subsystem updates (806) a location record associated with the data object in a location record database. The updated location record indicates that the data object is stored in the temporary storage location in the first availability zone.

After a time period (e.g., according to a schedule), the data storage management subsystem initiates (808) a data transfer of the data object from the temporary storage location in the first availability zone to the object repository in the second availability zone. Before the time period, the location record associated with the data object indicates that the data object is stored in the temporary storage location in the first availability zone.

After the data object is transferred to the object repository in the second availability zone, the data storage management subsystem further updates (810) the location record associated with the data object in the location record database. The further updated location record indicates that the data object is stored in the object repository in the second availability zone.

The location record database provides components of the system (e.g., LOTA proxies and the data storage management subsystem) a storage location of data objects stored in the system. The location record can indicate that a data object is stored in a cluster-wide cache of a particular computing cluster in a particular availability zone or in an object repository in a particular availability zone. As the location of the data object changes, the data storage management subsystem updates a location record associated with the data object.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers, a hardware accelerator, or multiple hardware accelerators. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, a container runtime environment, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:

a computing cluster comprising a plurality of physical computing nodes, wherein each computing node comprises:

a central processing subsystem comprising one or more central processing units (CPUs), a parallel processing subsystem comprising one or more hardware accelerator units, and a local storage subsystem comprising one or more data storage devices; and an object repository that is physically separate from each of the plurality of computing nodes;

wherein the central processing subsystem of each computing node is operable to execute software instructions that cause the central processing subsystem to perform operations to coordinate provisioning of computing workloads to the one or more hardware accelerator units of the parallel processing subsystem of each computing node, wherein the central processing subsystem of each computing node of the computing cluster is operable to execute instructions to implement a respective local object transport proxy, wherein the plurality of local object transport proxies in execution on the plurality of computing nodes collectively maintain a cluster-wide cache using each local storage subsystem of each physical computing node to cache data retrieved from the object repository, wherein the cluster-wide cache is a distributed cache that is configured to store portions of data objects within the local storage subsystems of multiple physical computing nodes wherein maintaining the cluster-wide cache comprises:

receiving, by a local object transport proxy on a first computing node, a request from a hardware accelerator unit of the first computing node for a data object;

determining, by the local object transport proxy, that the data object exists in the cluster-wide cache; and retrieving, by the local object transport proxy, the data object from the cluster-wide cache including retrieving a plurality of portions of the data object from the local storage subsystems of multiple physical computing nodes, wherein retrieving portions of the data object from multiple physical computing nodes comprises a first local object transport proxy of a first computing node providing a request for a portion of a data object to a second local object transport proxy executing on a node on which the portion of the data object is stored.

2. The system of claim 1, wherein maintaining the cluster-wide cache comprises:

determining that another data object does not exist in the cluster-wide cache; and retrieving, by the local object transport proxy, the other data object from an object repository of the cluster and providing the other data object to the requesting hardware accelerator unit.

3. The system of claim 2, wherein maintaining the cluster-wide cache further comprises storing the other data object in the cluster-wide cache, wherein storing the other data object in the cluster-wide cache comprises distributing portions of the other data object among multiple computing nodes.

4. The system of claim 1, wherein maintaining the cluster-wide cache comprises:

receiving an initial data upload request to store a plurality of data objects in the object repository; and while receiving and storing the plurality of data objects in the object repository, preloading the cache with the plurality of data objects until the cache reaches a maximum capacity.

5. The system of claim 4, wherein preloading the cache comprises:

receiving the data objects in portions; and distributing the received portions of the data objects across the local storage subsystems of the cluster-wide cache.

6. The system of claim 5, wherein distributing the received portions of the data objects comprises distributing the received portions of the data objects without reassembling each data object.

7. The system of claim 1, wherein each local object transport proxy is operable to request data from the object repository of the cluster using a data path that bypasses an object storage gateway.

8. The system of claim 1, wherein each local object transport proxy in execution is operable to use presigned requests for retrieving data from the object repository.

9. The system of claim 8, wherein each hardware accelerator unit provides requests to each respective local object transport proxy using a same communication protocol used by an object storage gateway.

10. The system of claim 9, wherein the presigned requests are generated by the object storage gateway that is configured to perform authentication and authorization for retrieving data from the object repository.

11. The system of claim 10, wherein each local object transport proxy in execution is configured to perform operations comprising:

receiving a request for data stored in the object repository;

providing a request to the object storage gateway for a presigned access location; and retrieving the data from the object repository using the presigned access location.

12. The system of claim 11, wherein retrieving the data from the object repository comprises using a data path that bypasses the object storage gateway, wherein the computing nodes and the local object transport proxies of the computing cluster are untrusted entities for the object repository.

13. The system of claim 12, wherein the object repository services multiple different untrusted clusters.

14. The system of claim 1, wherein each local object transport proxy is a software module that executes in a container hosted by container environment executed by the central processing subsystem.

15. A method performed by a system comprising:

a computing cluster comprising a plurality of physical computing nodes, wherein each computing node comprises:

a central processing subsystem comprising one or more central processing units (CPUs), a parallel processing subsystem comprising one or more hardware accelerator units, and a local storage subsystem comprising one or more data storage devices; and an object repository that is physically separate from each of the plurality of computing nodes, the method comprising:

coordinating, by central processing subsystem, provisioning of computing workloads to the one or more hardware accelerator units of the parallel processing subsystem of each computing node, wherein the central processing subsystem of each computing node of the computing cluster is operable to execute instructions to implement a respective local object transport proxy;

collectively maintaining, by the plurality of local object transport proxies in execution on the plurality of computing nodes, a cluster-wide cache using each local storage subsystem of each physical computing node to cache data retrieved from the object repository, wherein the cluster-wide cache is a distributed cache that is configured to store portions of data objects within the local storage subsystems of multiple physical computing nodes, and wherein maintaining the cluster-wide cache comprises:

receiving, by a local object transport proxy on a first computing node, a request from a hardware accelerator unit of the first computing node for a data object;

determining, by the local object transport proxy, that the data object exists in the cluster-wide cache; and retrieving, by the local object transport proxy, the data object from the cluster-wide cache including retrieving a plurality of portions of the data object from the local storage subsystems of multiple physical computing nodes, wherein retrieving portions of the data object from multiple physical computing nodes comprises a first local object transport proxy of a first computing node providing a request for a portion of a data object to a second local object transport proxy executing on a node on which the portion of the data object is stored.

16. The method of claim 15, wherein maintaining the cluster-wide cache comprises:

determining that another data object does not exist in the cluster-wide cache; and retrieving, by the local object transport proxy, the other data object from an object repository of the cluster and providing the other data object to the requesting hardware accelerator unit.

17. The method of claim 16, wherein maintaining the cluster-wide cache further comprises storing the other data object in the cluster-wide cache, wherein storing the other data object in the cluster-wide cache comprises distributing portions of the other data object among multiple computing nodes.

18. The method of claim 15, wherein maintaining the cluster-wide cache comprises:

receiving an initial data upload request to store a plurality of data objects in the object repository; and while receiving and storing the plurality of data objects in the object repository, preloading the cache with the plurality of data objects until the cache reaches a maximum capacity.

19. The method of claim 18, wherein preloading the cache comprises:

receiving the data objects in portions; and distributing the received portions of the data objects across the local storage subsystems of the cluster-wide cache.

20. The method of claim 19, wherein distributing the received portions of the data objects comprises distributing the received portions of the data objects without reassembling each data object.

21. The method of claim 15, wherein each local object transport proxy is operable to request data from the object repository of the cluster using a data path that bypasses an object storage gateway.

22. The method of claim 15, wherein each local object transport proxy in execution is operable to use presigned requests for retrieving data from the object repository.

23. The method of claim 22, wherein each hardware accelerator unit provides requests to each respective local object transport proxy using a same communication protocol used by an object storage gateway.

24. The method of claim 23, wherein the presigned requests are generated by the object storage gateway that is configured to perform authentication and authorization for retrieving data from the object repository.

25. The method of claim 24, wherein each local object transport proxy in execution is configured to perform operations comprising:

receiving a request for data stored in the object repository;

providing a request to the object storage gateway for a presigned access location; and retrieving the data from the object repository using the presigned access location.

26. The method of claim 25, wherein retrieving the data from the object repository comprises using a data path that bypasses the object storage gateway, wherein the computing nodes and the local object transport proxies of the computing cluster are untrusted entities for the object repository.

27. The method of claim 26, wherein the object repository services multiple different untrusted clusters.

28. The method of claim 15, wherein each local object transport proxy is a software module that executes in a container hosted by container environment executed by the central processing subsystem.

29. A system comprising:

a computing cluster comprising a plurality of physical computing nodes, wherein each computing node comprises:

a central processing subsystem comprising one or more central processing units (CPUs), a parallel processing subsystem comprising one or more hardware accelerator units, and a local storage subsystem comprising one or more data storage devices; and an object repository that is physically separate from each of the plurality of computing nodes;

wherein the central processing subsystem of each computing node is operable to execute software instructions that cause the central processing subsystem to perform operations to coordinate provisioning of computing workloads to the one or more hardware accelerator units of the parallel processing subsystem of each computing node, wherein the central processing subsystem of each computing node of the computing cluster is operable to execute instructions to implement a respective local object transport proxy, wherein the plurality of local object transport proxies in execution on the plurality of computing nodes collectively maintain a cluster-wide cache using each local storage subsystem of each physical computing node to cache data retrieved from the object repository, wherein maintaining the cluster-wide cache comprises:

receiving an initial data upload request to store a plurality of data objects in the object repository, and while receiving and storing the plurality of data objects in the object repository, preloading the cache with the plurality of data objects until the cache reaches a maximum capacity.

30. The system of claim 29, wherein preloading the cache comprises:

receiving the data objects in portions; and distributing the received portions of the data objects across the local storage subsystems of the cluster-wide cache.

31. The system of claim 30, wherein distributing the received portions of the data objects comprises distributing the received portions of the data objects without reassembling each data object.

32. The system of claim 29, wherein each local object transport proxy is operable to request data from the object repository of the cluster using a data path that bypasses an object storage gateway.

33. A method performed by a system comprising:

a computing cluster comprising a plurality of physical computing nodes, wherein each computing node comprises:

a central processing subsystem comprising one or more central processing units (CPUs), a parallel processing subsystem comprising one or more hardware accelerator units, and a local storage subsystem comprising one or more data storage devices; and an object repository that is physically separate from each of the plurality of computing nodes, the method comprising:

coordinating, by central processing subsystem, provisioning of computing workloads to the one or more hardware accelerator units of the parallel processing subsystem of each computing node, wherein the central processing subsystem of each computing node of the computing cluster is operable to execute instructions to implement a respective local object transport proxy; and collectively maintaining, by the plurality of local object transport proxies in execution on the plurality of computing nodes, a cluster-wide cache using each local storage subsystem of each physical computing node to cache data retrieved from the object repository, wherein maintaining the cluster-wide cache comprises:

receiving an initial data upload request to store a plurality of data objects in the object repository, and while receiving and storing the plurality of data objects in the object repository, preloading the cache with the plurality of data objects until the cache reaches a maximum capacity.

34. The method of claim 33, wherein preloading the cache comprises:

receiving the data objects in portions; and distributing the received portions of the data objects across the local storage subsystems of the cluster-wide cache.

35. The method of claim 34, wherein distributing the received portions of the data objects comprises distributing the received portions of the data objects without reassembling each data object.

36. The method of claim 33, wherein each local object transport proxy is operable to request data from the object repository of the cluster using a data path that bypasses an object storage gateway.

37. A system comprising:

a computing cluster comprising a plurality of physical computing nodes, wherein each computing node comprises:

a central processing subsystem comprising one or more central processing units (CPUs), a parallel processing subsystem comprising one or more hardware accelerator units, and a local storage subsystem comprising one or more data storage devices; and an object repository that is physically separate from each of the plurality of computing nodes;

wherein the central processing subsystem of each computing node is operable to execute software instructions that cause the central processing subsystem to perform operations to coordinate provisioning of computing workloads to the one or more hardware accelerator units of the parallel processing subsystem of each computing node, wherein the central processing subsystem of each computing node of the computing cluster is operable to execute instructions to implement a respective local object transport proxy, wherein the plurality of local object transport proxies in execution on the plurality of computing nodes collectively maintain a cluster-wide cache using each local storage subsystem of each physical computing node to cache data retrieved from the object repository, wherein each local object transport proxy in execution is operable to use presigned requests for retrieving data from the object repository.

38. The system of claim 37, wherein each hardware accelerator unit provides requests to each respective local object transport proxy using a same communication protocol used by an object storage gateway.

39. The system of claim 38, wherein the presigned requests are generated by the object storage gateway that is configured to perform authentication and authorization for retrieving data from the object repository.

40. The system of claim 39, wherein each local object transport proxy in execution is configured to perform operations comprising:

receiving a request for data stored in the object repository;

providing a request to the object storage gateway for a presigned access location; and retrieving the data from the object repository using the presigned access location.

41. The system of claim 40, wherein retrieving the data from the object repository comprises using a data path that bypasses the object storage gateway, wherein the computing nodes and the local object transport proxies of the computing cluster are untrusted entities for the object repository.

42. The system of claim 41, wherein the object repository services multiple different untrusted clusters.

43. A method performed by a system comprising:

a computing cluster comprising a plurality of physical computing nodes, wherein each computing node comprises:

a central processing subsystem comprising one or more central processing units (CPUs), a parallel processing subsystem comprising one or more hardware accelerator units, and a local storage subsystem comprising one or more data storage devices; and an object repository that is physically separate from each of the plurality of computing nodes, the method comprising:

coordinating, by central processing subsystem, provisioning of computing workloads to the one or more hardware accelerator units of the parallel processing subsystem of each computing node, wherein the central processing subsystem of each computing node of the computing cluster is operable to execute instructions to implement a respective local object transport proxy;

collectively maintaining, by the plurality of local object transport proxies in execution on the plurality of computing nodes, a cluster-wide cache using each local storage subsystem of each physical computing node to cache data retrieved from the object repository; and using, by each local object transport proxy, presigned requests for retrieving data from the object repository.

44. The method of claim 43, wherein each hardware accelerator unit provides requests to each respective local object transport proxy using a same communication protocol used by an object storage gateway.

45. The method of claim 44, wherein the presigned requests are generated by the object storage gateway that is configured to perform authentication and authorization for retrieving data from the object repository.

46. The method of claim 45, further comprising performing, by each local object transport proxy, operations comprising:

receiving a request for data stored in the object repository;

providing a request to the object storage gateway for a presigned access location; and retrieving the data from the object repository using the presigned access location.

47. The method of claim 46, wherein retrieving the data from the object repository comprises using a data path that bypasses the object storage gateway, wherein the computing nodes and the local object transport proxies of the computing cluster are untrusted entities for the object repository.

48. The method of claim 47, wherein the object repository services multiple different untrusted clusters.

\* \* \* \* \*